United States Patent
Hayashi et al.

(10) Patent No.: US 11,007,864 B2
(45) Date of Patent: May 18, 2021

(54) VEHICLE STRUCTURE

(71) Applicant: DENSO CORPORATION, Kariya (JP)

(72) Inventors: Norihiro Hayashi, Kariya (JP); Tetsuro Okazono, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/592,824

(22) Filed: Oct. 4, 2019

(65) Prior Publication Data

US 2020/0114750 A1    Apr. 16, 2020

(30) Foreign Application Priority Data

Oct. 16, 2018  (JP) .............................. JP2018-194808

(51) Int. Cl.
| | |
|---|---|
| *B60K 6/485* | (2007.10) |
| *B60K 1/04* | (2019.01) |
| *B60K 15/03* | (2006.01) |
| *F02M 37/00* | (2006.01) |
| *B60K 1/00* | (2006.01) |

(52) U.S. Cl.
CPC .............. *B60K 6/485* (2013.01); *B60K 1/04* (2013.01); *B60K 15/03* (2013.01); *B60K 2001/005* (2013.01); *B60K 2015/03243* (2013.01); *F02M 37/00* (2013.01)

(58) Field of Classification Search
CPC ............ B60K 6/485; B60K 6/46; B60K 6/48; B60K 1/04; B60K 15/03; B60K 2001/005; B60K 2001/2001; B60K 2001/0433; B60K 2015/03243; B60K 2015/0633

USPC ..................................................... 123/198 R
See application file for complete search history.

(56) References Cited

U.S. PATENT DOCUMENTS

| | | | |
|---|---|---|---|
| 5,596,971 A | 1/1997 | Kidokoro | |
| 5,975,331 A | 11/1999 | Ishikawa | |
| 2003/0102029 A1* | 6/2003 | Crook | ..................... B60L 50/66 137/260 |
| 2008/0000703 A1 | 1/2008 | Shindou | |
| 2013/0174804 A1 | 7/2013 | Matsuda | |
| 2016/0369757 A1 | 12/2016 | Aso | |
| 2017/0166048 A1* | 6/2017 | Saeki | ................. F02M 37/0047 |
| 2019/0031013 A1* | 1/2019 | Ajisaka | ................ B60K 15/063 |

FOREIGN PATENT DOCUMENTS

| | | |
|---|---|---|
| JP | H10-157682 | 6/1998 |
| JP | H10-250385 | 9/1998 |
| JP | 2001-018667 | 1/2001 |
| JP | 2001-050128 | 2/2001 |
| JP | 2004-019507 | 1/2004 |
| JP | 2012-148749 | 8/2012 |
| JP | 6344219 | 6/2018 |

* cited by examiner

*Primary Examiner* — Lindsay M Low
*Assistant Examiner* — Omar Morales
(74) *Attorney, Agent, or Firm* — Nixon & Vanderhye P.C.

(57) ABSTRACT

A vehicle structure includes a fuel tank configured to store a fuel supplied to an internal-combustion engine of a vehicle and a battery configured to store an electric power supplied to an electric motor of the vehicle to drive the vehicle. A gravity center of the battery is lower than a gravity center of the fuel tank, and at least a part of the fuel tank overlaps with the battery in a top plan view of the vehicle.

10 Claims, 9 Drawing Sheets

VEHICLE STRUCTURE

CROSS REFERENCE TO RELATED APPLICATION

This application is based on Japanese Patent Application No. 2018-194808 filed on Oct. 16, 2018, the disclosure of which is incorporated herein by reference in its entirety.

TECHNICAL FIELD

The present disclosure relates to a vehicle structure.

BACKGROUND

A vehicle such as a hybrid vehicle and a range extended electric vehicle, which includes an internal-combustion engine and an electric motor, has been developed. The vehicle includes both of a fuel tank to store fuel for the internal-combustion engine and a battery to store electric power for the electric motor.

SUMMARY

According to an aspect of the present disclosure, a vehicle structure includes a fuel tank having fuel supplied to an internal-combustion engine and a battery storing electric power supplied to an electric motor to drive a vehicle. The fuel tank and the battery in this vehicle structure are disposed so that a gravity center of the battery is lower than a gravity center of the fuel tank. In a top plan view of the vehicle, at least a part of the fuel tank overlaps with the battery.

DETAILED DESCRIPTION

To begin with, examples of relevant techniques will be described.

A vehicle such as a hybrid vehicle and a range extended electric vehicle, which includes an internal-combustion engine and an electric motor, has been developed. The internal-combustion engine is used as a power source or a generator. The electric motor is used as a power source. The vehicle includes both of a fuel tank to store fuel for the internal-combustion engine and a battery to store electric power for the electric motor.

To lengthen a travelable distance in Electric Vehicle (EV) mode, the vehicle above should increase a storage capacity of the battery and the size of the battery. To increase the size of the battery, it is required to place components, such as the battery, in an optimum layout in the limited vehicle space.

The battery may be placed above the fuel tank. In this case, the gravity center of the vehicle becomes higher as increasing the size of the battery. This lowers the traveling stability. In addition, as consuming fuel in the fuel tank, the gravity center of the vehicle becomes higher, and the traveling stability is lowered. Alternatively, the battery and the fuel tank may be placed at nearly the same height and arranged in a back and forth direction or in a right and left direction. As consuming fuel in the fuel tank, the gravity center of the vehicle shifts in the back and forth direction or in the right and left direction, which reduces the traveling stability.

The present disclosure is provided with embodiments described as below.

According to an aspect of the present disclosure, a vehicle structure includes a fuel tank having fuel supplied to an internal-combustion engine and a battery storing electric power supplied to an electric motor to drive a vehicle. The fuel tank and the battery in this vehicle structure are disposed so that a gravity center of the battery is lower than a gravity center of the fuel tank. In a top plan view of the vehicle, at least a part of the fuel tank overlaps with the battery.

The vehicle structure of this embodiment reduces a shift in the gravity center of the vehicle accompanied by consuming the fuel in the fuel tank, and improves the travelling stability of the vehicle.

First Embodiment

Figure 1:
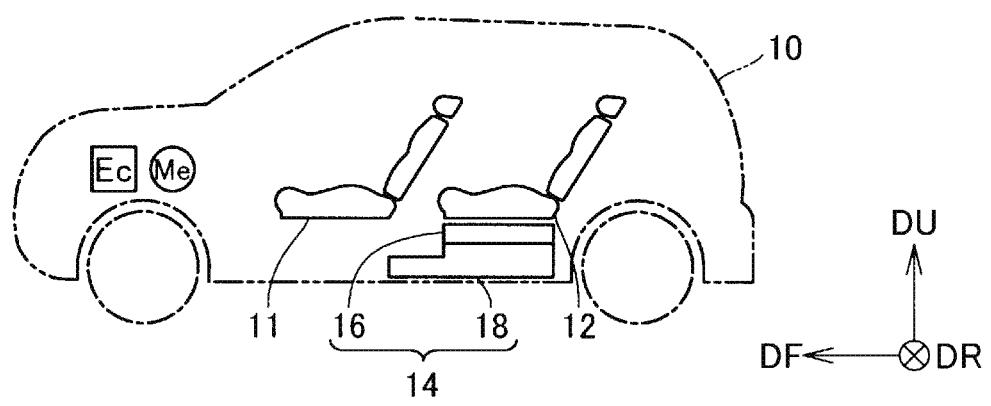
FIG. 1 is a schematic side view illustrating a vehicle structure in accordance with the first embodiment.

A vehicle structure is applied to a vehicle 10 in FIG. 1 in accordance with the first embodiment. In FIG. 1, the left side is forward side of the vehicle, the right side is backward side of the vehicle, the up side is upper side of the vehicle, and the down side is down side of the vehicle. FIG. 1 is illustrated by being seen from the left side of the vehicle. In each figure, an arrow DF shows the front direction of the vehicle, an arrow DU shows the up direction of the vehicle, and an arrow DR shows the right direction of the vehicle.

As shown in FIG. 1, the vehicle 10 includes a front seat 11 and a rear seat 12. A battery unit 14 is provided under the rear seat 12. The battery unit 14 has a battery 18 to drive the vehicle and a fuel tank 16 above the battery 18. The vehicle 10 has an internal-combustion engine Ec for which fuel in the fuel tank 16 is provided and an electric motor Me for which electric power from the battery 18 is provided. The vehicle 10 may be a hybrid vehicle, which appropriately obtains the driving force from the internal-combustion engine Ec and/or the electric motor Me. The vehicle 10 may be a range extended electric vehicle, which stores electric power in the battery 18 from a generator (not shown) driven by the internal-combustion engine Ec and receives driving force from the electric motor Me driven by electric power from the battery 18.

Figure 2:
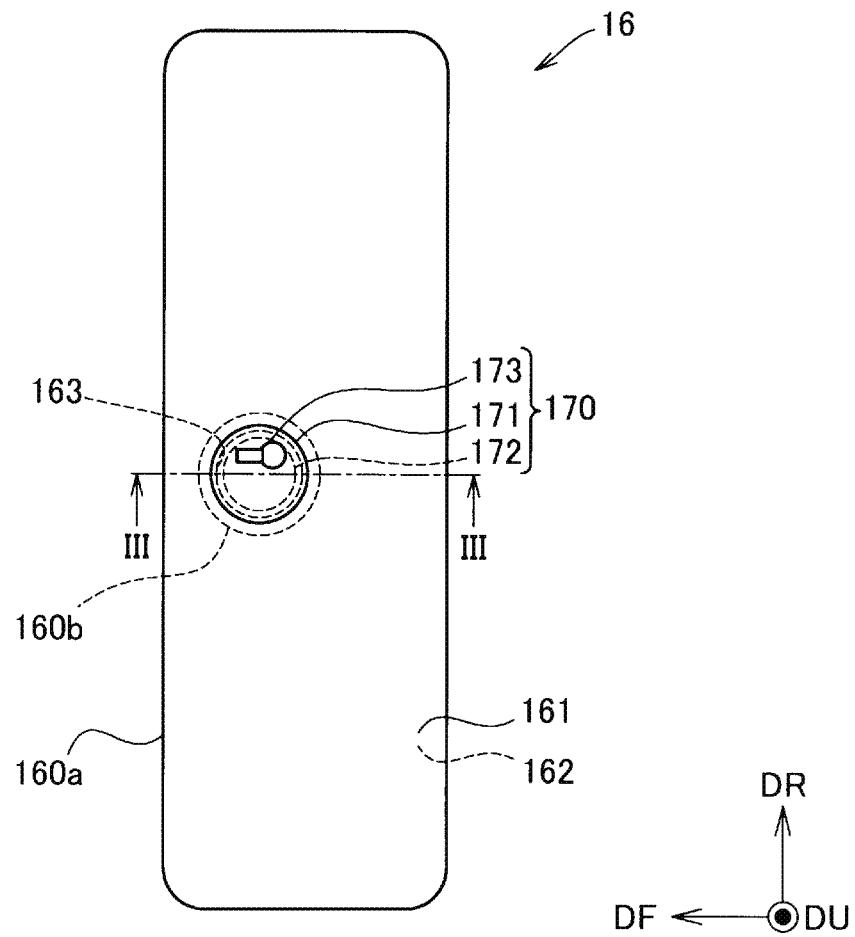
FIG. 2 is an outline plan view of a fuel tank.
Figure 3:
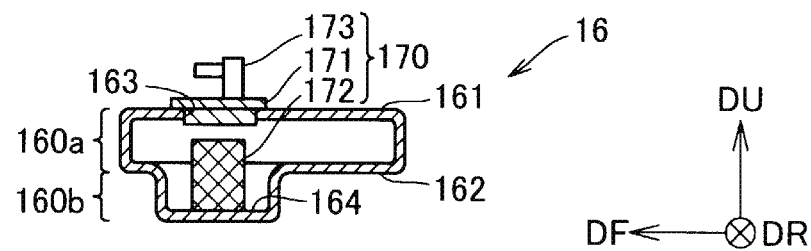
FIG. 3 is a cross-section view taken along with the line III-Ill in FIG. 2.

The fuel tank 16 includes a hollow, rectangular parallelepiped body 160a and a hollow cylindrical projection 160b as described in FIGS. 2 and 3. The projection 160b protrudes from an undersurface 162 of the body 160a downward. An upper surface 161 of the body 160a has an opening 163 that corresponds to the projection 160b in a top plan view of the vehicle. The opening 163 receives a fuel supply system 170. The fuel supply system 170 has a lid 171 attached to the opening 163, a pump 172 inside the fuel tank 16, and a pipe connection 173 disposed on an upper side of the lid 171. The pump 172 is positioned with an arrangement member (not shown) so that the undersurface of the pump 172 is adjacent to the inner surface (also called the bottom surface) of a lower wall 164 of the fuel tank 16 as shown in FIG. 3. The pump 172 and the pipe connection 173 are connected with a connection hose (not shown). The pump 172 is also connected to an electric supply wiring (not shown). An electric supply connector (not shown) is provided on the top of the lid 171.

Figure 4:
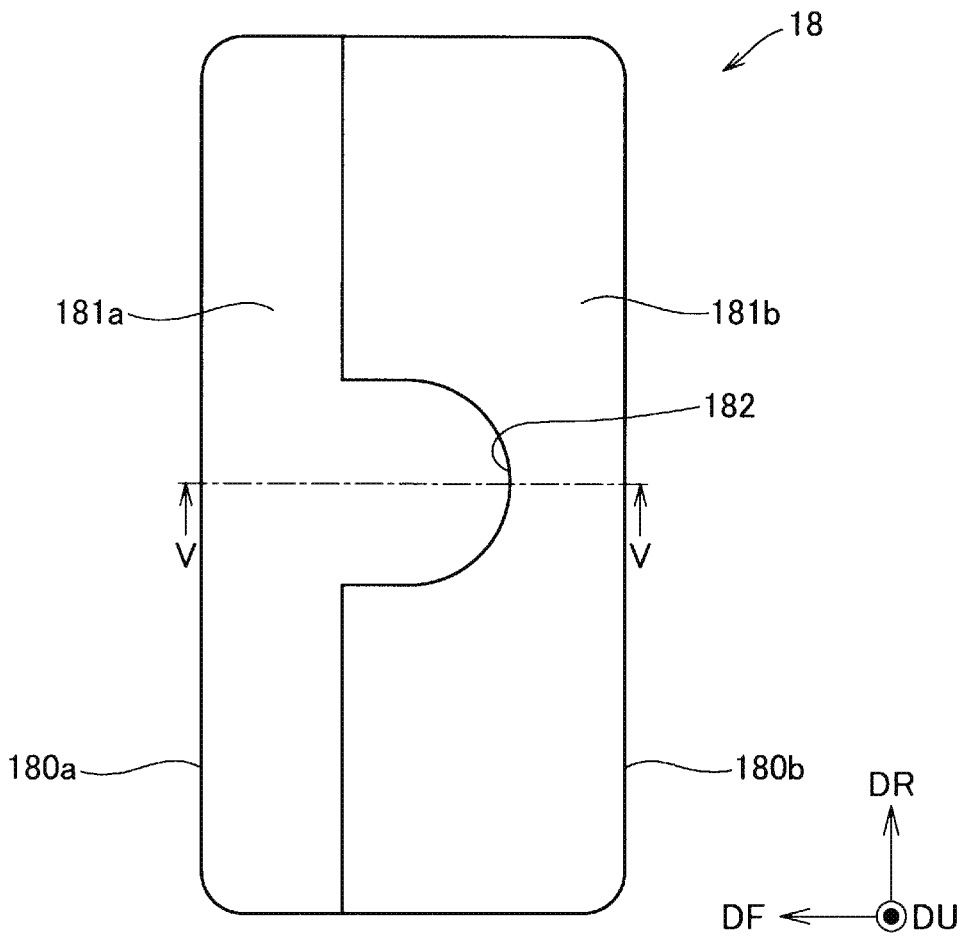
FIG. 4 is an outline plan view of a battery to drive the vehicle.
Figure 5:
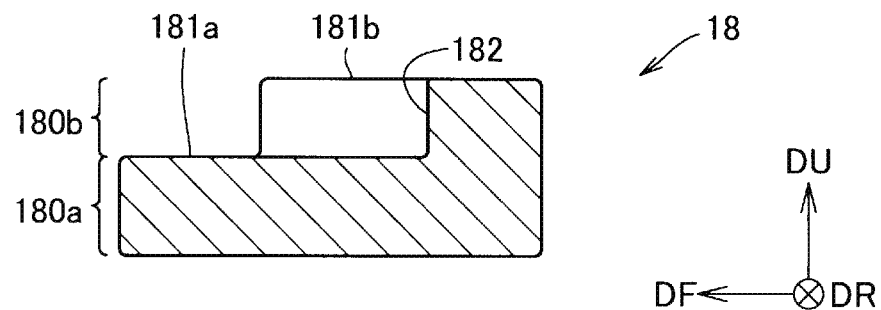
FIG. 5 is a cross-section view taken along with the line V-V in FIG. 4.

As illustrated in FIGS. 4 and 5, the battery 18 has a rectangular paralleled first part 180a and a rectangular paralleled second part 180b as an exterior part having the battery inside. The second part 180b is located in the rear of the first part 180a and protrudes upward. A side of the exterior part viewed from a side of the vehicle is L-shaped. An upper surface 181b of the second part 180b has a recess 182 that corresponds to the projection 160b when the fuel tank 16 is disposed. The recess 182 passes through the first part 180a to make a space to insert the projection 160b of the fuel tank 16.

Figure 6:
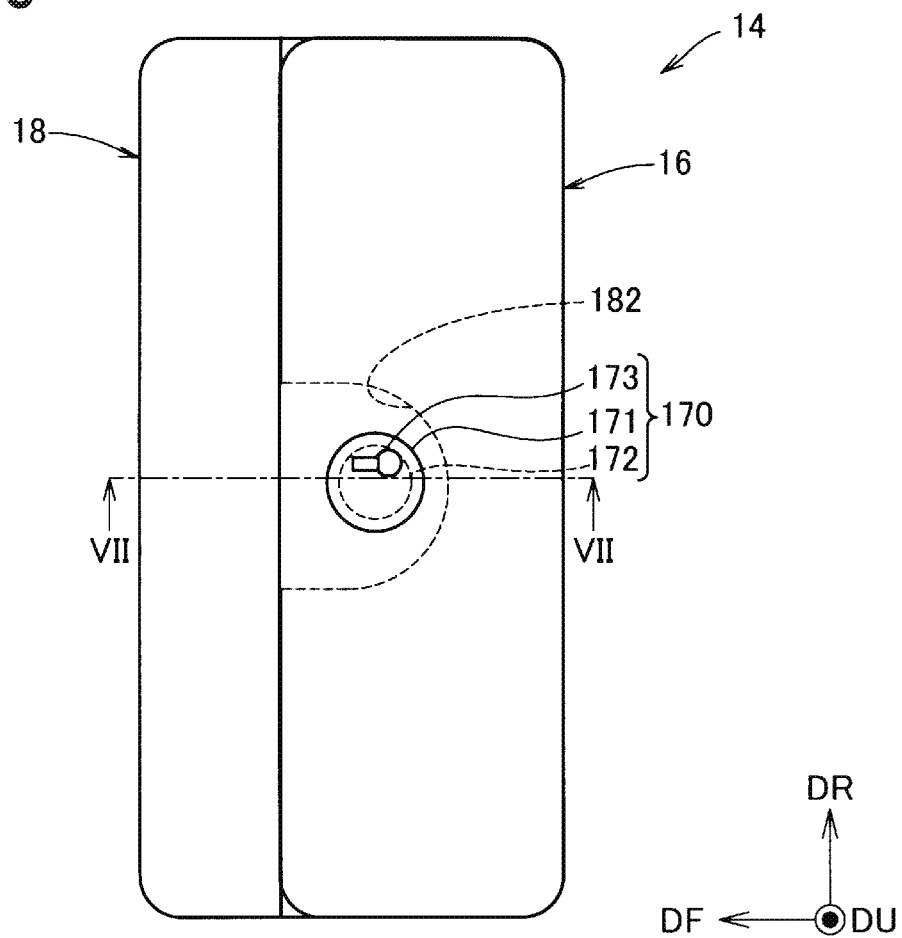
FIG. 6 is an outline plan view of a battery unit.
Figure 7:
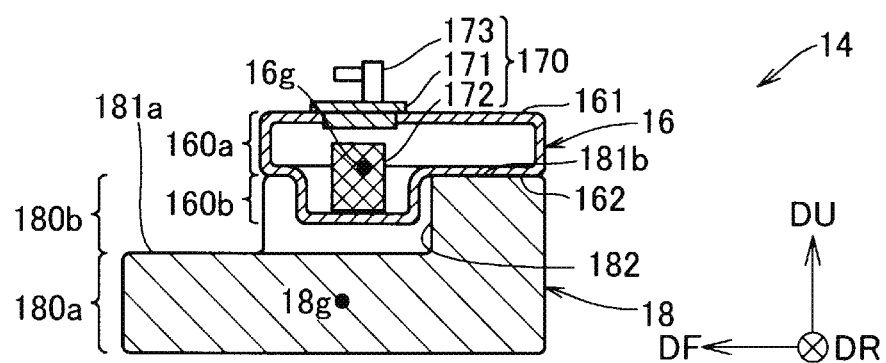
FIG. 7 is a cross-section view taken along with the line VII-VII in FIG. 6

The battery unit 14 in FIGS. 6 and 7 has the fuel tank 16 and the battery 18. The undersurface 162 of the fuel tank 16 is adjacent to the upper surface 161b of the battery 18 with an attachment (not shown). The fuel tank 16 is disposed so that the projection 160b of the fuel tank 16 (see FIG. 3) fits in the recess 182 of the battery 18 (see FIGS. 4 and 5).

The battery unit 14 is disposed such that the gravity center 18g of the battery 18 is lower than the gravity center 16g of the fuel tank 16. The fuel tank 16 entirely overlaps with the battery 18 in a top plan view of the vehicle. The gravity center 16g of the fuel tank 16 is calculated with the fuel tank that is fully filled with fuel. The fuel tank 16 that stores any amount of fuel satisfies the disposition condition as described above. The weight of the battery 18 may be larger than the weight of the fuel tank 16 that is fully filled with fuel. The relative density of the battery 18 may be greater than the relative density of the fuel tank 16 that is fully filled with fuel.

As described above, the battery unit 14 (see FIG. 1) is disposed so that the gravity center 18g of the battery 18 is lower than the gravity center 16g of the fuel tank 16 in the vehicle. In a top plan view of the vehicle, the fuel tank 16 entirely overlaps with the battery 18 (see FIGS. 2 and 3). This vehicle structure in the embodiment reduces a shift in the gravity center of the vehicle in the back and forth direction and the right and left direction and improves the travelling stability. In addition, the larger weight of the battery than the fuel tank that is fully filled with fuel keeps the gravity center of the vehicle low. Keeping the low gravity center reduces a shift in the gravity center accompanied by the change of the residual fuel in the fuel tank 16 in the up and down direction. Thus, the travelling stability of the vehicle is improved.

Second Embodiment

Figure 8:
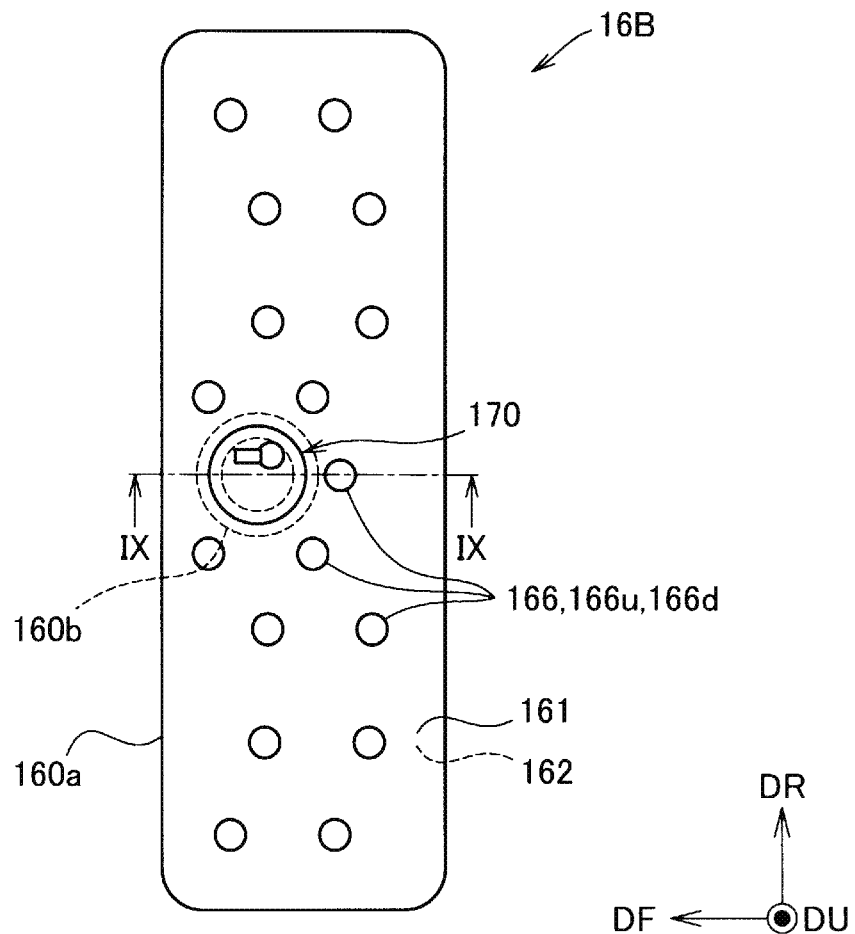
FIG. 8 is a cross-section view of a fuel tank in accordance with the second embodiment.
Figure 9:
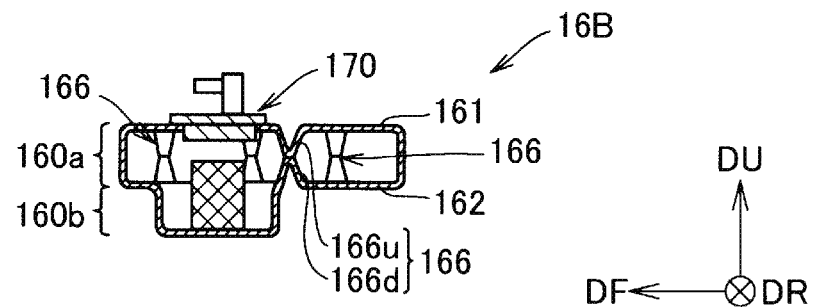
FIG. 9 is a cross-section view taken along with the line IX-IX in FIG. 8.

A battery unit in the second embodiment is the same with that of the first embodiment (see FIGS. 6 and 7) except for using a fuel tank 16B in FIGS. 8 and 9 in place of the fuel tank 16 (see FIGS. 2 and 3). The same symbol with that of the first embodiment shows the same structure shown in preceding explanations.

The fuel tank 16B has plural reinforcing members 166 arranged over an inner space between the upper surface 161 and the undersurface 162. The reinforcing members 166 are pillar structures. The pillar structures are formed inside of the fuel tank 16B by joining an upper projection 166u protruded from the upper surface 161 with a lower projection 166d protruded from the undersurface 162. For example, each of the reinforcing members 166 is formed as below. The upper surface 161 and the undersurface 162 are thermoformed and extended to the inner space to get the upper projection 166u and the lower projection 166d respectively. The upper projection 166u and the lower projection 166d are welded to form each reinforcing member 166.

The reinforcing members 166 can improve the rigidity of the fuel tank 16B. Thus, a tank that has a desired rigidity is obtained without a large increase in the thickness of the tank wall. The tank in this embodiment can be used as a sealed fuel tank and reduce a deforming amount.

The vehicle structure in the second embodiment, same as the first embodiment, reduces a shift in the gravity center of the vehicle in the back and forth direction and the right and left direction and improves the travelling stability of the vehicle. The larger weight of the battery than the fuel tank that is fully filled with fuel keeps the gravity center of the vehicle low. Keeping the low gravity center reduces the gravity center shift accompanied by the change of the residual fuel in the fuel tank 16B in the up and down direction. Thus, the travelling stability of the vehicle is improved.

Third Embodiment

Figure 10:
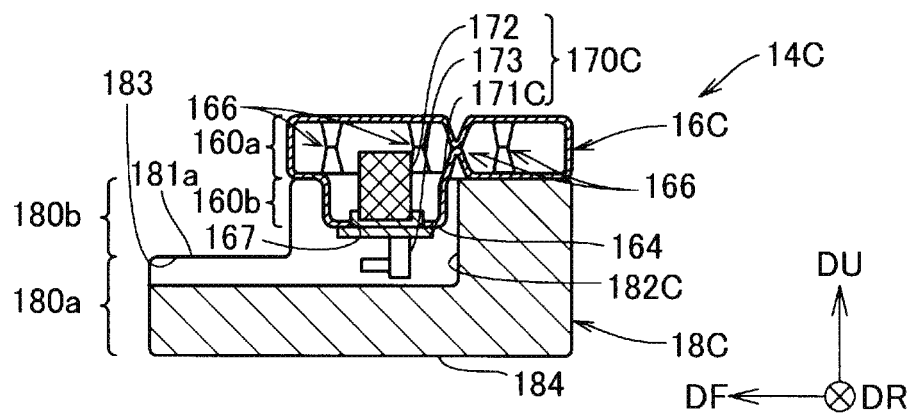
FIG. 10 is a cross-section view of a battery unit in accordance with the third embodiment.

As shown in FIG. 10, a battery unit 14C in the third embodiment has a fuel tank 16C and a battery 18C in place of the fuel tank 16 and the battery 18 in the first embodiment (see FIGS. 6 and 7). The same symbol in the first and second embodiment shows the same structure shown in preceding explanations.

The fuel tank 16 in the first embodiment has the fuel supply system 170 at the opening 163 of the upper surface 161 of the body 160a (see FIG. 3). As shown in FIG. 10, the fuel tank 16C in the third embodiment has a fuel supply system 170C at the opening 167 of the lower wall 164 of the projection 160b. As with the fuel tank 16B in the second embodiment (see FIG. 9), the fuel tank 16C has plural reinforcing members 166, which allows the same effect described in the second embodiment. Other structure is the same with that of the fuel tank 16.

Figure 11:
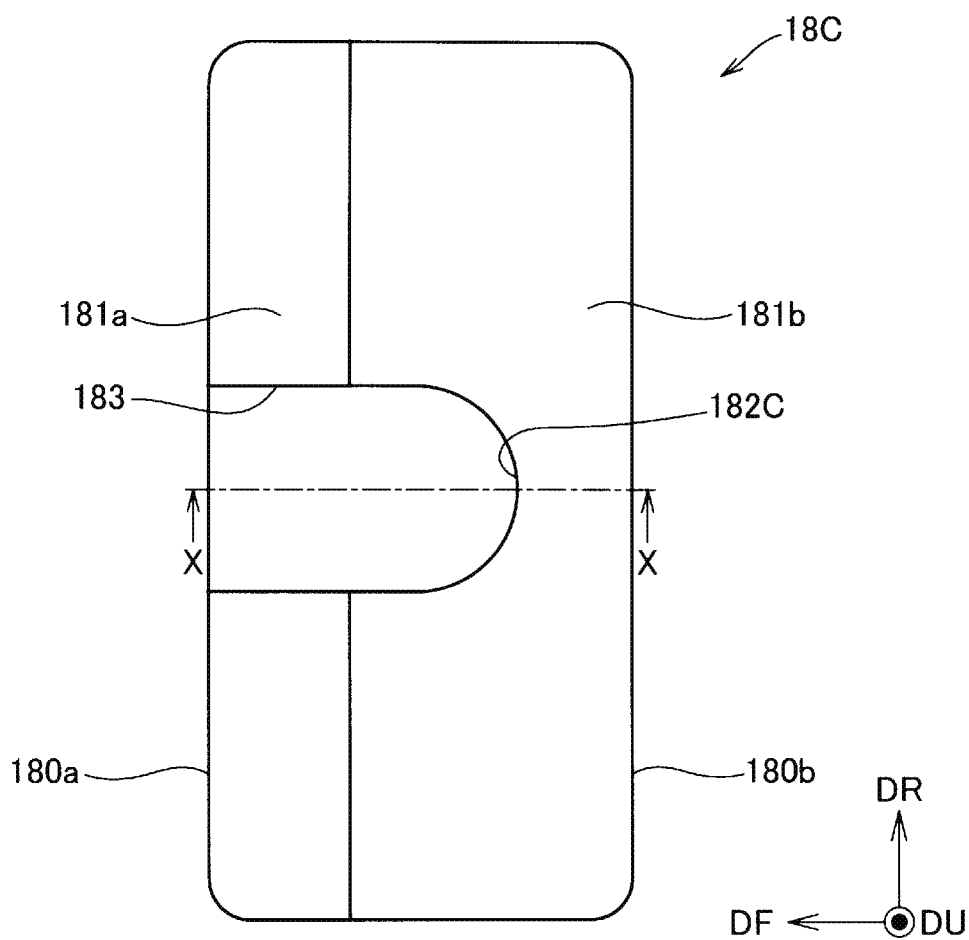
FIG. 11 is an outline plan view of a battery in FIG. 10.

The battery 18 in the first embodiment has the recess 182 in an area that corresponds to the projection 160b of the fuel tank 16. The recess 182 passes through the first part 180a to make a space to insert the projection 160b of the fuel tank 16 (see FIGS. 3 and 4). As shown in FIG. 10, the fuel tank 16C of the third embodiment has a recess 182C that is recessed to the position between the upper surface 181a and the undersurface 184 of the first part 180a. As shown in FIGS. 10 and 11, in front of the recess 182C in the vehicle, a recess 183 is provided. The recess 183 is recessed downward to be lower than the upper surface 181a along with the bottom of the recess 182C. Other structure is the same with the battery 18. FIG. 10 shows the cross-section view taken along with the line X-X in FIG. 11.

The pump 172 in the fuel supply system 170C is fixed so that the bottom of the pump 172 is adjacent to a lid 171C on the lower wall 164 of the projection 160b as shown in FIG. 10. This structure eliminates a component for the fuel supply system 170 of the fuel tank 16 (see FIG. 3) to attach the bottom of the pump 172 to the lower wall 164. This reduces the weight of the fuel tank.

The pipe connection 173 in the fuel supply system 170C is disposed under the lower wall 164 of the projection 160b of the fuel tank 16C. As shown in FIG. 10, the pipe connection 173 is located inside the recess 182C of the battery 18C, which protects the lid 171C and the pipe connection 173.

The battery 18C has the recess 183 in front of the recess 182C. The recess 183 houses and protects a pipe connected to the pipe connection 173.

The vehicle structure in the third embodiment, as with the first embodiment, reduces a shift in the gravity center of the vehicle in the back and forth direction and the right and left direction and improves the traveling stability of the vehicle. The larger weight of the battery 18 than the fuel tank 16C that is fully filled with fuel keeps the gravity center of the vehicle low. Keeping the low gravity center reduces a shift in the gravity center accompanied by the change of the residual fuel in the fuel tank 16C in the up and down direction. Thus, the traveling stability of the vehicle is improved.

Fourth Embodiment

Figure 12:
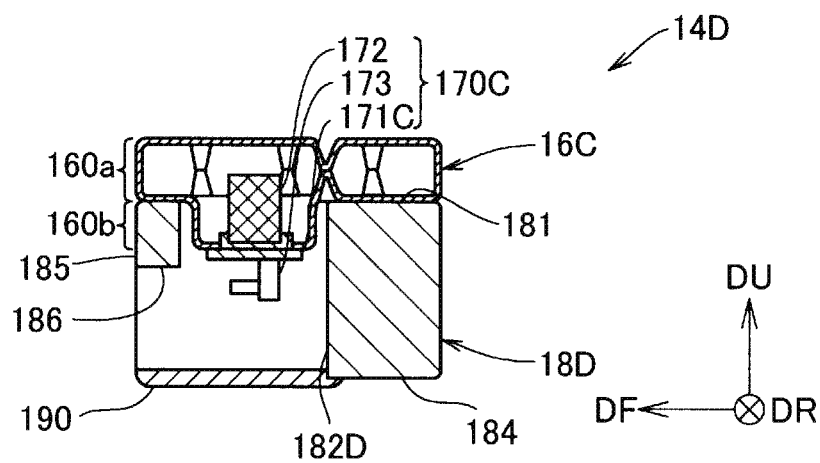
FIG. 12 is a cross-section view of a battery unit in accordance with the fourth embodiment.

As shown in FIG. 12, the battery unit 14D in the fourth embodiment has the fuel tank 16C and a battery 18D in place of the fuel tank 16 and the battery 18 in the first embodiment (see FIGS. 6 and 7). The same symbol of the first and second embodiments shows the same structure shown in preceding explanations.

The fuel tank 16C is the fuel tank explained in the third embodiment, which allows the same effect described in the third embodiment.

Figure 13:
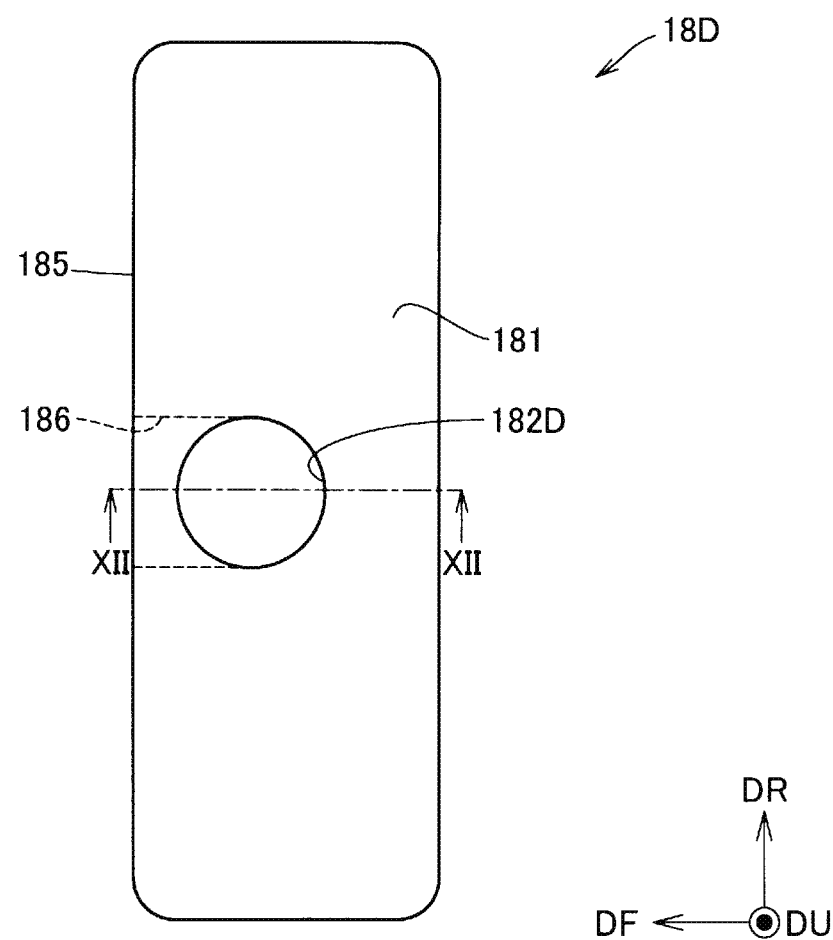
FIG. 13 is an outline plan view of a battery in FIG. 12.

A battery 18D is a rectangular paralleled shape as shown in FIGS. 12 and 13. The upper surface 181 has a recess 182D that corresponds to the projection 160b of the fuel tank 16C when the fuel tank 16C is disposed. The recess 182D passes through the battery 18D to make a space to insert the projection 160b, the lid 171C of the fuel supply system 170C, and the pipe connection 173. A front surface 185 of the battery 18D also has a recess 186. The recess 186 is recessed from both of the front surface 185 and the undersurface 184 and communicates with the recess 182D. FIG. 12 shows the cross-section view taken along with the line XII-XII in FIG. 13.

In the battery unit 14D in the fourth embodiment, the recess 182D and the recess 186 of the battery 18D are exposed from the undersurface 184. This makes easy to access the pipe connection 173 in the fuel supply system 170C from both of the undersurface 184 and the front surface 185. Thus, connecting, handling, putting, and removing the pipe will be easier.

The battery 18D may have a cover 190 attachable to or detachable from the undersurface 184 of the battery 18D to cover the recess 182D and the recess 186 as shown in FIG. 12. The cover 190 protects the pipe connection 173 at the lid 171C and a pipe connected to the pipe connection 173. In addition, the cover 190 makes the undersurface 184 flat. Thus, a down part of the vehicle having the battery unit 14D can be flat.

The vehicle structure in the fourth embodiment, as with in the first embodiment, reduces a shift in the gravity center of the vehicle in the back and forth and the right and left direction and improves the travelling stability of the vehicle. In addition, the larger weight of the battery 18 than the fuel tank 16C that is fully filled with fuel keeps the gravity center of the vehicle low. Thus, the travelling stability of the vehicle is improved.

Fifth Embodiment

Figure 14:
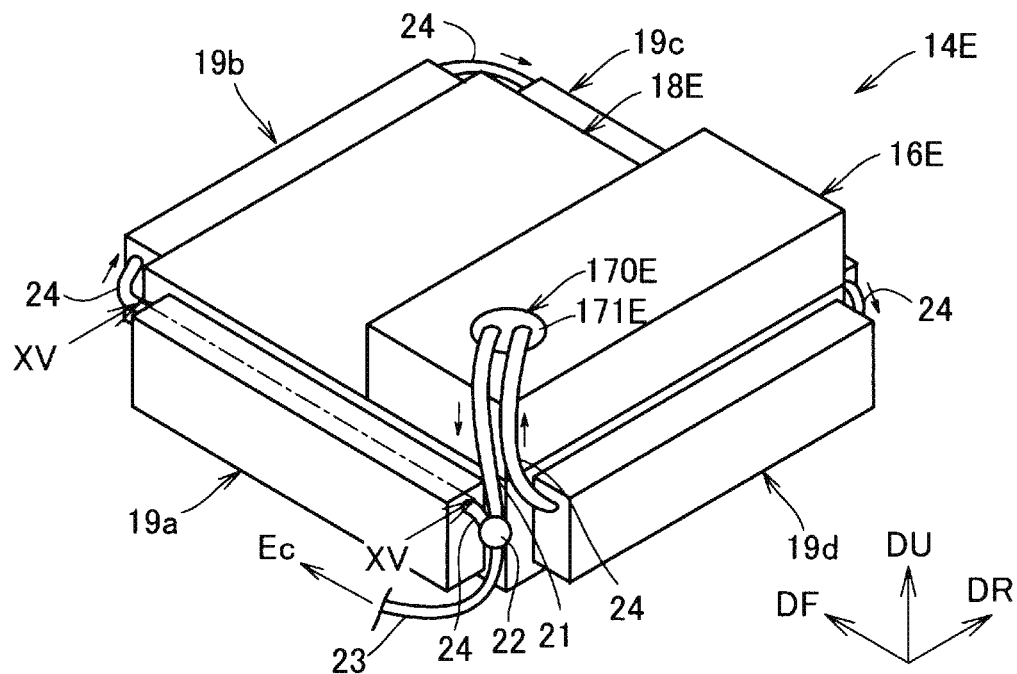
FIG. 14 is a perspective view of a battery unit in accordance with the fifth embodiment.

As shown in FIG. 14, a battery unit 14E in the fifth embodiment has a fuel tank 16E above a battery 18E as with the battery unit 14 in the first embodiment.

The four sides of the battery 18E have heat sinks 19a, 19b, 19c, and 19d respectively.

An upper surface of the fuel tank 16E attaches a fuel supply system 170E thorough a lid 171E. The lid 171E has a pipe connection (not shown) connected with a fuel pipe 21 and a fuel pipe 24. The fuel pipe 21 is connected with a direction selector valve 22. The fuel flowing out of the fuel tank 16E through the fuel pipe 21 is back to the fuel tank 16E through the direction selector valve 22, and by flowing through the fuel pipe 24 in the heat sink 19a, the heat sink 19b, the heat sink 19c, and the heat sink 19d. The direction selector valve 22 also connects the fuel pipe 23 through which fuel flows to the internal-combustion engine Ec. The direction selector valve 22 has a function to regulate the flow ratio of the fuel in the fuel pipe 23 and the fuel in the fuel pipe 24.

Figure 15:
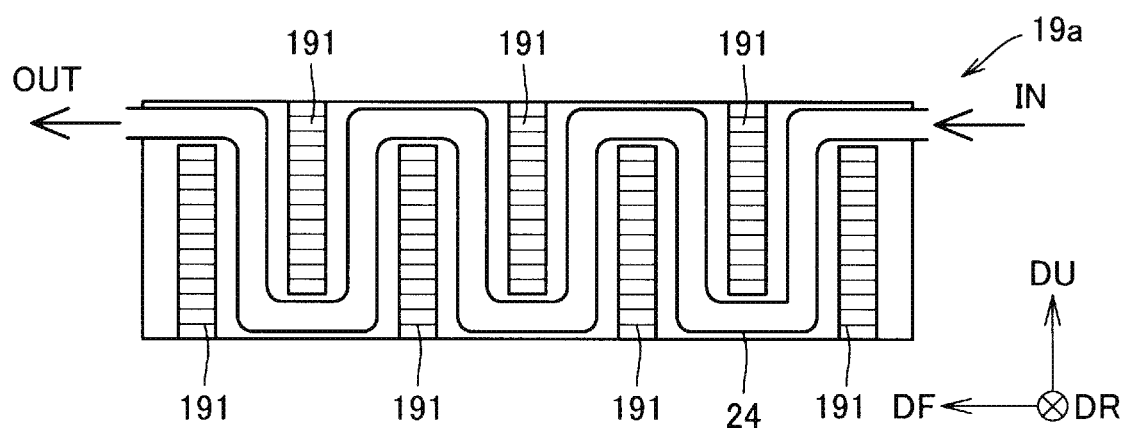
FIG. 15 is a cross-section view taken along with the line XV-XV in FIG. 14.

The heat sink 19a has plural cooling fins 191 arranged from the upstream to the downstream in the fuel pipe 24 as shown in FIG. 15. The fuel pipe 24 locates along a space between the walls of the cooling fins 191. The other heat sinks 19b, 19c, and 19d are in the same condition as the heat sink 19a.

The fuel flows through the fuel pipe 24 in the heat sink 19a, 19b, 19c, and 19d, which cools the cooling fins 19 and the battery 18F. The direction selector valve 22 controls the cooling degree by regulating the flow ratio in the fuel pipe 24.

The vehicle structure in the fifth embodiment, as with in the first embodiment, reduces a shift in the gravity center of the vehicle in the back and forth and the right and left direction and improves the travelling stability of the vehicle. The larger weight of the battery 18 than the fuel tank 16E that is fully filled with fuel keeps the gravity center of the vehicle low. Keeping the low gravity center reduces a shift in the gravity center accompanied by the change of the residual fuel in the fuel tank 16E in the up and down direction. Thus, the travelling stability of the vehicle is improved.

Figure 16:
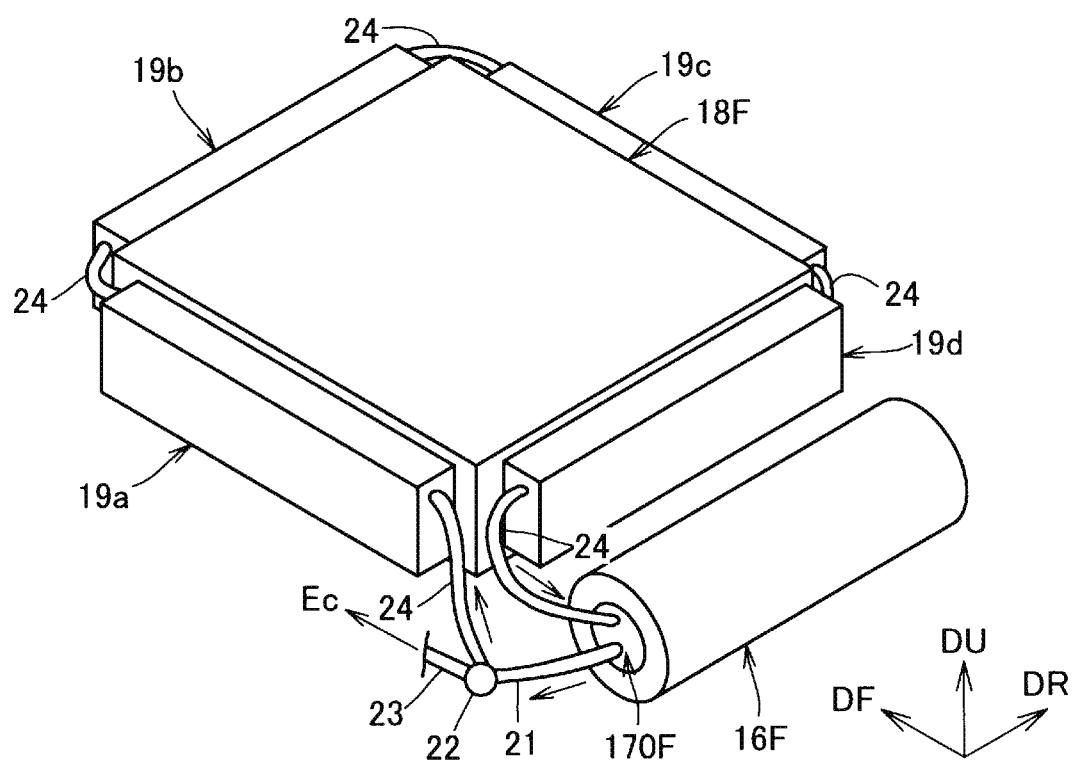
FIG. 16 is a perspective view of a battery unit in accordance with a reference embodiment.

As shown in FIG. 16, in the case that the fuel tank 16F is positioned beside the battery 18F, not above the battery 18F, the fuel pipe 24 can be disposed in the heat sink 19a, 19b, 19c and 19d. The heat sinks 19a, 19b, 19c and 19d that cool the battery 18F are positioned on four sides of the battery 18F respectively.

Other Embodiments

In the first to fourth embodiments, the fuel tank 16, 16B, 16C entirely overlaps with the battery 18, 18B, 18C, 18D in a plan view. However, the position of the fuel tank is not limited to these embodiments. At least a part of the fuel tank may overlap with the battery. This also allows the same effect described in each embodiment.

The exterior shape of the fuel tank and the battery are not limited to the shape described in the first to fourth embodiments. The fuel tank 16, 16B, 16C has a projection 160b protruded downward from the body 160a in each embodiment. However, the fuel tank 16, 16B, 16C may be a rectangular paralleled fuel tank without the projection 160b. The side surface of the battery 18, 18C in the first to third embodiments is L-shaped. However, the side surface of the battery 18, 18C may be rectangular paralleled. The shape of each component does not have limitations while the gravity center of the battery is lower than the gravity center of the fuel tank and at least a part of the fuel tank overlaps with the battery. This allows the same effect described in each embodiment. However, in the third and fourth embodiments, the lower wall 164 of the projection 160b having the lid 171C is under the uppermost surface 181b, 181 and above the undermost surface 184 of the battery 18C, 18D.

It should be appreciated that the present disclosure is not limited to the embodiments described above and can be modified appropriately within the scope of the appended claims. For example, the technical features in each embodiment can be replaced and combined appropriately to solve a part or all of the issues, or to achieve a part or all of the effects. In addition, the technical features can be deleted appropriately as long as the features are explained as essential in the present description.

What is claimed is:

1. A vehicle structure comprising:
   a fuel tank configured to store a fuel supplied to an internal-combustion engine of a vehicle; and
   a battery configured to store an electric power supplied to an electric motor of the vehicle to drive the vehicle, wherein
   a gravity center of the battery is lower than a gravity center of the fuel tank,
   at least a part of the fuel tank overlaps with the battery in a top plan view of the vehicle,
   the at least a part of the fuel tank is located in an upper side of an uppermost surface of the battery,
   the fuel tank includes a rectangular parallelepiped body and a cylindrical projection protruding from a lower surface of the rectangular parallelepiped body downward,
   the battery includes a first part shaped in a rectangular paralleled body and a second part shaped in a rectangular paralleled body,
   the second part protrudes from an upper surface of the first part upward, and
   the second part has a recess recessed from an upper surface of the second part to house the cylindrical projection of the fuel tank.

2. The vehicle structure according to claim 1, wherein
   a weight of the battery is larger than a weight of the fuel tank that is fully filled with the fuel.

3. The vehicle structure according to claim 1 further comprising:
   a lid disposed on a lower wall of the fuel tank to attach a fuel supply system to the fuel tank to send the fuel from the fuel tank, wherein
   the lid is located under the uppermost surface of the battery and above an undermost surface of the battery.

4. The vehicle structure according to claim 3, wherein
   the fuel tank has a projection protruded downward from a bottom surface of the fuel tank, the lid being arranged in the projection,
   the battery has a recess where the projection is arranged, and
   the recess passes through the battery.

5. The vehicle structure according to claim 4 further comprising,
   a cover attachable to or detachable from the undermost surface of the battery.

6. The vehicle structure according to claim 1, wherein
   a lower surface of the rectangular parallelepiped body of the fuel tank is in contact with an upper surface of the second part of the battery, and
   a clearance is defined between a lower surface of the cylindrical projection of the fuel tank and an upper surface of the first part of the battery.

7. The vehicle structure according to claim 6, wherein
   a clearance is defined between an outer cylindrical surface of the cylindrical projection of the fuel tank and a cylindrical surface of the second part of the battery.

8. The vehicle structure according to claim 1, wherein
   the fuel tank defines an opening through which the fuel in the fuel tank is supplied to the internal combustion engine on a lower wall of the cylindrical projection of the fuel tank,
   the fuel tank has a lid attached to the opening to attach a fuel supply system to the fuel tank to send the fuel from the fuel tank, and
   the lid is housed in the recess of the second part.

9. The vehicle structure according to claim 1, wherein
   the fuel tank includes a body portion and a projection protruding from a lower surface of the body portion downward; and
   the battery includes a recess defined in an upper surface of the battery into which the projection of the fuel tank is inserted.

10. The vehicle structure according to claim 9, wherein
    the vehicle structure further comprises a fuel pump that is at least partially housed within the projection of the fuel tank and at least partially housed within the recess of the battery.

* * * * *